(12) United States Patent
Bordone et al.

(10) Patent No.: US 12,277,352 B2
(45) Date of Patent: Apr. 15, 2025

(54) PEN SERVICING DETERMINATION

(71) Applicant: Hewlett-Packard Development Company, L.P., Spring, TX (US)

(72) Inventors: Maurizio Bordone, Sant Cugat del Valles (ES); Eduardo Amela Conesa, Sant Cugat del Valles (ES); Mauricio Seras Franzoso, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 268 days.

(21) Appl. No.: 18/042,834

(22) PCT Filed: Aug. 27, 2020

(86) PCT No.: PCT/US2020/048146
§ 371 (c)(1),
(2) Date: Feb. 24, 2023

(87) PCT Pub. No.: WO2022/046056
PCT Pub. Date: Mar. 3, 2022

(65) Prior Publication Data
US 2023/0325127 A1      Oct. 12, 2023

(51) Int. Cl.
*B41J 2/165*        (2006.01)
*B41J 2/21*         (2006.01)
*G06F 3/12*         (2006.01)

(52) U.S. Cl.
CPC ........ *G06F 3/1208* (2013.01); *B41J 2/16508* (2013.01); *B41J 2/16517* (2013.01); *B41J 2/16526* (2013.01); *B41J 2/16535* (2013.01); *B41J 2/16552* (2013.01); *G06F 3/121* (2013.01); *G06F 3/1229* (2013.01); *G06F 3/1257* (2013.01); *G06F 3/1273* (2013.01); *B41J 2002/1655* (2013.01); *B41J 2002/1657* (2013.01); *B41J 2/2114* (2013.01); *G06F 3/1285* (2013.01)

(58) Field of Classification Search
CPC ...... G06F 3/1208; G06F 3/121; G06F 3/1229; G06F 3/1257; G06F 3/1273; G06F 3/1285; B41J 2/16508; B41J 2/16517; B41J 2/16526; B41J 2/16535; B41J 2/16552; B41J 2/2114; B41J 2002/1655; B41J 2002/1657
See application file for complete search history.

(56) References Cited

U.S. PATENT DOCUMENTS

| 5,548,688 | A | | 8/1996 | Wiklof et al. |
| 5,583,547 | A | | 12/1996 | Gast et al. |
| 5,625,399 | A | | 4/1997 | Wiklof et al. |
| 6,045,206 | A | * | 4/2000 | Igval .................. B41J 2/01 347/19 |

(Continued)

*Primary Examiner* — Yaovi M Ameh
(74) *Attorney, Agent, or Firm* — Jordan IP Law, LLC

(57) ABSTRACT

Examples include a method for operating a printing device comprising a specific pen. The method comprises receiving future specific pen firing data related to a plurality of upcoming successive print jobs and collecting historical specific pen firing data. The method further comprises determining a level and timing of servicing of the specific pen in function of both of the received future specific pen firing data and of the collected historical specific pen firing data.

15 Claims, 2 Drawing Sheets

(56) References Cited

U.S. PATENT DOCUMENTS

| | | |
|---|---|---|
| 6,172,691 B1 | 1/2001 | Belon et al. |
| 6,293,646 B1* | 9/2001 | Beachnau Hood .. B41J 2/16526 |
| | | 347/23 |
| 6,447,091 B1 | 9/2002 | Calvo et al. |
| 6,517,184 B1 | 2/2003 | Bruch et al. |
| 6,722,752 B2 | 4/2004 | Davis et al. |
| 6,938,971 B2 | 9/2005 | Gom Z et al. |
| 2002/0113831 A1* | 8/2002 | Su ........................ B41J 2/04563 |
| | | 347/14 |
| 2003/0117455 A1 | 6/2003 | Bruch et al. |
| 2009/0091596 A1 | 4/2009 | Askeland et al. |
| 2016/0098234 A1* | 4/2016 | Weaver ................ G06F 3/1234 |
| | | 358/1.15 |

* cited by examiner

PEN SERVICING DETERMINATION

BACKGROUND

This disclosure generally relates to the servicing of a pen or, as also known in the art, a printhead of a printer. Such a pen is used to eject a fluid, and may get clogged over time. Servicing a pen permits reducing the risk of clogging, or unclogging a clogged pen. Servicing thereby permits recovering the functionality of a pen, or maintaining the functionality of a pen over an operational period of time. Servicing may comprise a sequence of clearing fluid ejection nozzles of the pen. While permitting maintaining or increasing a printing quality, running such a sequence may have an impact on a printer throughput or printer productivity.

DETAILED DESCRIPTION

While servicing of a pen may for example take place solely in reaction to a cumulative pen firing amount, or directly prior to printing a specific high quality print job, the present description aims at taking into account data related to a plurality of upcoming successive print jobs in order to predict when and which type of servicing may take place to avoid or reduce an impact on a printer throughput or productivity. Taking a plurality of upcoming successive print jobs into account indeed for example provides visibility as to servicing opportunities between print jobs, or during one or more specific upcoming print jobs. Such visibility permits for example delaying a pending servicing or advancing a pending service to a moment better adapted to such servicing. This permits in some cases maintaining or increasing a printer through put or productivity while limiting or even suppressing quality issues due to clogging by implementing a predictive servicing determination as per this disclosure. Such predictive servicing permits reducing printing interruptions and increasing printing quality.

Figure 1:
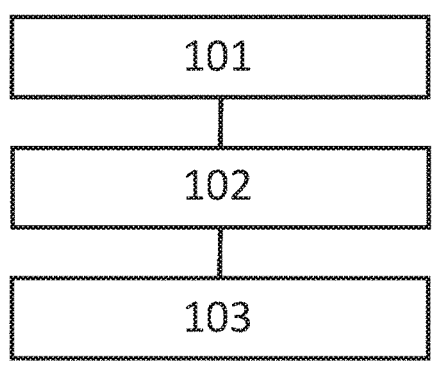
FIG. 1 illustrates a first example method.

An example of method 100 according to this disclosure for operating a printing device comprising a specific pen is shown in FIG. 1. A printing device comprising a specific pen should be understood in this disclosure as a printer permitting ejecting a printing fluid, e.g., ink on a media. Example printer includes inkjet printers, for example piezo or thermal inkjet printers. In some examples, the ink is a latex based ink which is particularly suited for printing on different media and may be suitable to being exposed to external weather conditions, in other examples, the printing fluid may be a non-marking fluid such as, e.g., an overcoat or a fixer. The media on which printing takes place may take different forms and be made of different materials, adhesion properties, porosity, roughness or compositions. In some examples, the media is in the form of a flexible sheet. In some examples the media is in the form of a rigid board. In some examples, the media comprises cellulose based fiber such as paper or cardboard. In some examples the media comprises wood. In some examples the media comprises textile. In some examples the media comprises metal. In some examples the media comprises glass. In some examples the media comprises leather. In some examples, the media comprises a plastic resin or a transparent plastic resin or polymer such as Poly(methyl methacrylate), PMMA, or Polyvinyl chloride, PVC, for example. The specific pen according to this disclosure should be understood as a device comprising a plurality of nozzle for ejecting a fluid on a media, the pen comprising circuitry permitting firing of the fluid from the nozzles of the pen onto the media. Such circuitry may be connected to piezo or thermal actuators connected to ejection chambers associated with the nozzles. While a specific pen according to this disclosure may be in some examples configured to eject printing fluid on the media, the specific pen may in other examples be configured to eject a fluid types other than an ink, such as pretreatment or post treatment fluids which may be transparent and serve to prepare a media for receiving an ink, or serve to fix an ink onto the media.

Example method 100 comprises a block 101 of receiving future specific pen firing data related to a plurality of upcoming successive print jobs. The specific pen firing data should be understood to correspond to data indicating pen firing variables such as, for example, pen firing frequency or pen firing volume. Future specific pen firing data should be understood to be firing data which will be transmitted to the pen a future time and related to a print job pipeline. Such data may be provided in some examples through a field programmable gate array, FPGA, printer controller. Such data relates to a plurality of upcoming successive print jobs. A plurality should be understood as more than 1 upcoming successive print jobs. In some examples, the plurality comprises at least three upcoming successive print jobs being a first, second and third upcoming successive print jobs, in order to consider two or more inter print job intervals in an example method according to this disclosure. The print jobs are upcoming in that the effective printing, i.e. the ejection of fluid by the specific pen, associated to the upcoming print jobs has not started at the moment at which the future specific pen firing data is received. The print jobs are successive in that the print jobs of the plurality directly follow each other, a print job of the plurality being either separated by a next print job of the plurality by an interval during which printing does not take place, or in that the printing directly continues onto the next print job without printing an intermediate print job which would not be comprised in the same plurality.

Example method 100 comprises a block 102 of collecting historical specific pen firing data. The collecting historical specific pen firing data may take place on a memory or data storage device. The collecting historical specific pen firing data permits evaluating an amount of firing of fluid during a past period of time for the specific pen concerned. The historical specific pen firing data may be periodically reset, for example at a time when the specific pen is submitted to a specific service, such specific service permitting assuming that the pen may be considered substantially unclogged. Collecting historical specific pen firing data permits estimating how much the specific pen has been firing over a period of time, thereby permitting evaluating a cumulated clogging of the specific pen over such period of time.

Example method 100 comprises a block 103 of determining a level and timing of servicing of the specific pen in function of both of the received future specific pen firing data and of the collected historical specific pen firing data. The determining may for example take place using a printer controller processor. A level of servicing should be understood to refer to an intensity of servicing. Servicing may comprise one or more actions such as spitting or wiping for example. Spitting should be understood as operating the pen so as to have the pen ejecting fluid for the purpose of servicing, the spitting thereby wetting nozzles of the pen and participating in clearing nozzles which may be obstructed. Spitting for the purpose of servicing should be understood as taking place in addition to the ejection of fluid for the purpose of printing. Spitting may take place then a pen is on a print zone, or when a pen is over a spittoon. The pen is in some examples a pen reciprocating over a print zone, thereby configured to print swaths when scanning the print zone. When spitting over the print zone, the pen may spit over printing media located over the print zone, may spit over the print zone itself, or may spit over a media support element present in the print zone. When spitting over the print zone, the spitting may result in contaminating a print job, in contaminating the print zone, or in contaminating a media support element present in the print zone. Such contamination may have undesired consequences such as a visual impact on a printing media for example. Such spitting over the print zone however permits spitting while the pen is in movement, thereby enabling servicing while lowering an impact on printer productivity. Spitting over the print zone thereby introduces a compromise between printer throughput and printing quality by contamination. Spitting over a spittoon permits avoiding contamination, the fluid being spitted landing in the spittoon in lieu of landing on the print zone, printing media or media support element. In some example of the methods hereby described, the printing system comprises a spittoon, the servicing of the specific pen comprising the specific pen spitting in the spittoon. Spitting over a spittoon may permit spitting of larger quantities of fluid than spitting over the print zone, the spitting over a spittoon thereby corresponding to a servicing level higher than a spitting over the print zone. Spitting may take place as the pen is in movement, or as the pen is in a static position. Spitting while the pen is in movement permits maintaining through put of the printer compared to spitting while in a static position. Wiping of a specific pen is considered as a servicing action more intense in service level than servicing. Wiping should be understood as producing friction, using a wiper, on nozzles of the specific pen, in order to foment clearing obstructed nozzles. Applying friction on nozzles is more aggressive than spitting as wiping is based on applying a mechanical force onto the nozzles. While wiping may participate in clearing nozzles which may remain obstructed even after spitting, wiping also may deteriorate some nozzles. Wipers may be web wipers permitting refreshing a wiping surface by unrolling the web wiper. In some examples, the methods hereby described permit reducing a use of wiping material, thereby reducing an amount of waste and cost of such wiping material. Determining a level of servicing thereby permits evaluating whether a servicing should be more or less aggressive or intense, in function for example of the collected historical specific pen firing data, whereby, for example, a pen which has been firing little fluid over a relatively long period of time may be particularly clogged due to the fluid drying out on nozzles of the pen, in which case a higher level of servicing such as comprising wiping may be appropriate. Indeed, in some examples, the methods hereby described are such that the level of servicing of the specific pen comprises a lower level of servicing and a higher level of servicing. Determining a timing of servicing permits evaluating when a servicing should take place in order to reduce impact on printing quality and printer throughput. If, for example, the specific pen is a yellow ink specific pen which, in light of historical firing data, would benefit from spitting, a printer controller may identify that one print job of the upcoming successive print jobs comprises a yellow area during which spitting may take place while printing on the media without impact on printing quality and without impact on throughput, the printer controller may determine that such spitting be delayed until such printing on a yellow area takes place. Such example may also permit heavy spitting while printing on such yellow area, for example permitting delaying wiping of the specific pen. In another example, the printer controller may determine that a gap may be present between two successive print jobs of the plurality of upcoming successive print jobs, for example due to a change of printing media, and thereby determine that wiping or static spitting over a spittoon may be determined at the time of the gap, thereby delaying such wiping or static spitting until such gap in order to avowing impact on throughput. In some examples, a gap may be of more than 10 cm. In some examples, a gap may be of more than 20 cm. In some examples, a gap may be of more than 30 cm. In some examples, a gap may be of less than 50 cm. The example method thereby permits choosing a level and timing of servicing in light of both historical data informing of the health of the specific pen, and in light of future print jobs permitting predicting an appropriate servicing time and level, leading to synergistically aligning, on one hand constraints of a printing pipeline for a plurality of print jobs, and on the other hand servicing level and timing constraints to each other, thereby leading to a favourable compromise between printing quality and printer throughput.

Figure 2:
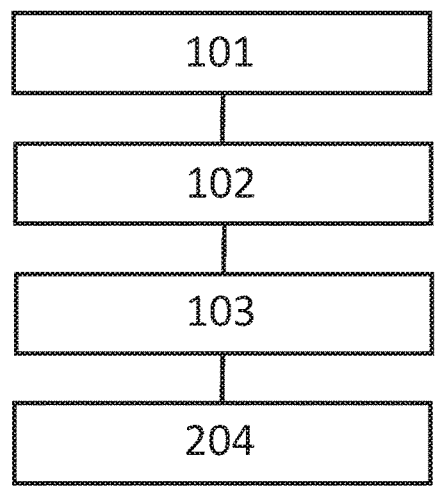
FIG. 2 illustrates a second example method.

FIG. 2 illustrates another example method 200 according to this disclosure. Method 200 comprises the blocks 101, 102 and 103 as described for example method 100. Example method 200 is such that each upcoming successive print job of the plurality is associated to a respective printing media, the printing device comprising a conveyor system for placing the respective printing media, comprising in block 204 printing the successive upcoming print jobs on the respective printing media as the conveyor system places the respective media in a print zone of the printing device. A conveyor system should be understood as a media support element, such conveyor system permitting displacement of a printing media along a printing path and across a print zone of the printer. A conveyor system may enable providing printing media according to a hot lading modality, whereby a stream of printing media is fed to the printer in order to concatenate print jobs. A conveyer system may comprise mechanical elements, for example rollers, such as driven or freewheeling rollers, or a conveyor belt in another example. The presence of a conveyor system permits using printing media having different characteristics such as different sizes, thicknesses, rigidity or weight. The presence of a conveyor system however renders some servicing more difficult to execute, for example spitting while the specific pen flies over the conveyor system, thereby risking staining the conveyor system, potentially contaminating following print jobs or contaminating the conveyor system itself, for example when printing on a printing media which does not span a full width of the conveyor system in the printing area, some areas of the conveyor system being directly exposed to the firing of fluid by the specific pen. While the presence of a conveyor system adds as further constraint as to determining a servicing level, the presence of a conveyor system is associated to the loading of different printing media, thereby introducing servicing timing opportunities between the respective printing media as they are separated by gaps on the conveyor system, thereby permitting for example to determine that wiping or spitting in the spittoon may take place during such gaps. Example method 200 thereby permits leveraging a potential additional constraint, being the presence of a conveyor system, to predict servicing opportunities. In some examples, the conveyor system comprises a conveyor belt, in particular a conveyor belt passing through a print zone of the printer, rendering the spitting by flying by of the specific pen even more susceptible to contaminate the conveyor system, thereby rendering example method 200 particularly beneficial in such cases.

Figure 3:
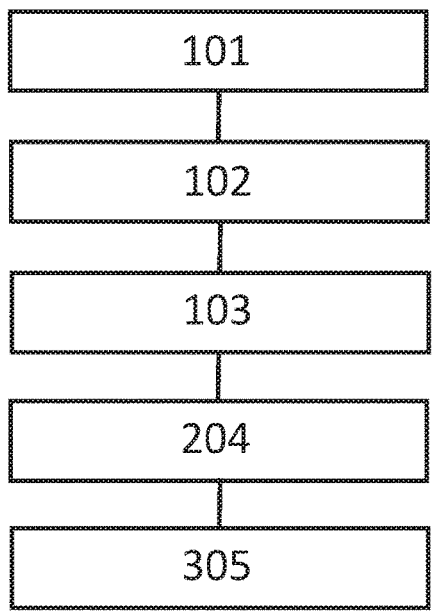
FIG. 3 illustrates a third example method.

FIG. 3 illustrates another example method 300. Example method 300 comprises blocks 101, 102 and 103 according to example method 100, as well as block 204 as per example method 200—Example method 300 applies to a situation whereby a specific printing media of the respective printing media is separated from a following printing media by a gap, the method 300 comprising in block 305 comparing the gap to a predetermined gap threshold. The comparison to a predetermined gap threshold may for example permit determining that a gap is sufficiently large to permit intensive wiping, permitting to determine that wiping will take place during such gap if such gap exceeds the predetermined gap threshold. On the other hand, a gap below the predetermined gap threshold may permit spitting in a spittoon in lieu of wiping.

Figure 4:
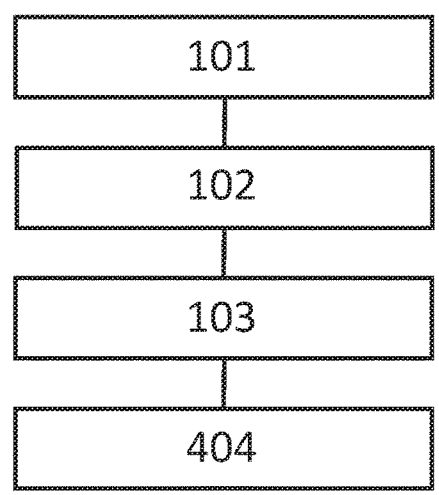
FIG. 4 illustrates a fourth example method.

In some examples such as in the case of the example methods hereby described, the specific pen comprises a pretreatment fluid. A pretreatment fluid may for example prepare a printing media to improve adhesion of ink. A pretreatment fluid may in some cases promote affixing media on a substrate and be particularly suited to facilitating printing on a large variety of substrates. In some examples, the pretreatment fluid comprises a crashing agent and a wetting agent. In some examples, the pretreatment fluid comprises an aqueous fluid including a wetting agent and a crashing agent consisting of a cationic organic polymer, cationic surfactant or quaternary salt, an acid, a multivalent metal cation, or combinations thereof. While benefiting printing quality by participating in ink adhesion or ink penetration on a printing media, the presence of a specific pen comprising a pretreatment fluid may also have an impact on servicing as such pretreatment fluid may participate in promoting nozzle clogging, for example clogging of a printing fluid nozzle on which the pretreatment fluid may have been sprayed. The presence of such specific pen comprising a pretreatment fluid thereby renders the methods according to this disclosure particularly beneficial, whereby the servicing of the specific pen comprising pretreatment ink, or of additional pens, such additional pens comprising for example printing fluid, may be determined in order to facilitate servicing of such pens. Indeed, the methods hereby described may apply to a printing device comprising a specific pen comprising a pretreatment fluid, and comprising an additional pen, the additional pen comprising a printing fluid, more particularly a latex liquid ink, thereby rendering the methods hereby described of particular benefit. Pretreatment fluid may be applied across a printing media surface regardless of a type of printing fluid being also fired on a same media, leading to a relatively heavy firing rhythm, such specific pen comprising pretreatment fluid thereby being particularly subject to clogging if not appropriately serviced. Pretreatment fluid may also be more likely to clog than other fluids such as printing fluid. In example method 400 illustrated by FIG. 4, which comprises block 101-103, and may also comprise blocks such as 204 or 305, block 404 comprises servicing the specific pen separately from a servicing of the additional pen, in order to avoid cross-contaminating the additional pen by pretreatment fluid when servicing the specific pen comprising such pretreatment fluid. In some examples according to method 400, the servicing of the specific pen separately from the servicing of the additional pen is separated in time, for example by determining the servicing of the specific pen during a first gap separating print jobs of the plurality of upcoming successive print jobs, and by determining the servicing of the additional pen during a second gap separating print jobs of the plurality of upcoming successive print jobs, the first gap differing from the second gap, such determining being enabled by the receiving as per block 102 permitting gap prediction. In other examples, the servicing of the specific pen separately from the servicing of the additional pen is separated in space, for example by servicing the specific pen and the additional pen in distinct servicing locations, or using distinct spittoons, or using different wipers or wiper webs. In some examples the printing system comprises a plurality of web wipers, whereby the servicing of the specific pen as per block 404 comprises wiping the specific pen with a specific web wiper from the plurality of web wipers, the servicing of the additional pen comprising wiping the additional pen with a web wipers of the plurality of web wipers other than the specific web wiper, in order to avoid contaminating printing fluid nozzles, for example liquid ink nozzles, with pretreatment fluid.

In some examples such as any of the example methods hereby described, the method further comprises receiving future additional pen firing data related to the plurality of upcoming successive print jobs. Receiving this additional pen related data in addition to the specific pen related data permits identifying gaps which may apply for example to the printing of ink, and thereby permit servicing a specific pen comprising pretreatment ink during an ink printing gap.

Figure 5:
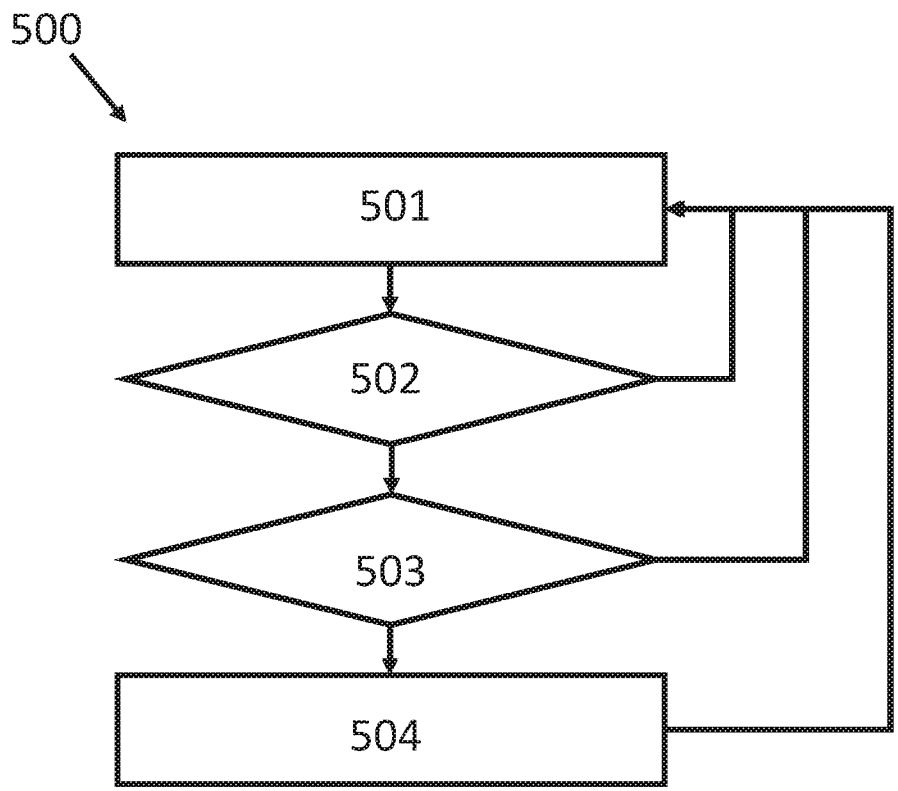
FIG. 5 illustrates a fifth example method.

FIG. 5 illustrates an example method 500 according to this disclosure. In block 501, example method 500 comprises collecting historical specific pen firing data, for example from an FPGA of a printer controller. In block 502, method 500 comprises determining if the collected historical specific pen firing data exceeds a predetermined threshold corresponding for example to an amount of fluid fired by square meter corresponding to a clogging risk of the specific pen. In some examples, the threshold corresponds to a number of swaths during which the specific pen has been firing, for example a threshold of 40 swaps, of 50 swaps or of 60 swaps. In some examples, the threshold corresponds to a number of square meters which have been covered by the firing of the specific pen, for example a threshold of 4 square meters, 6 square meters or 8 square meters. In some examples, the method comprises adjusting the threshold. If such collected historical specific pen firing data exceed the predetermined threshold of block 502, the example method 500 moves on to block 503. If the collected historical specific pen firing data is at or below the predetermined threshold of block 502, the example method 500 moves back to block 501 of collecting historical specific pen firing data, thereby cumulating such collected historical specific pen firing data and iterating through block 502 again. In block 503, the method 500 comprises receiving future specific pen firing data related to a plurality of upcoming successive print jobs so as to determine whether a blank printing gap is present in the future printing pipeline comprising the plurality of successive print jobs which would exceed in gap length, or gap time, a predetermined gap length, or, respectively, gap time, threshold. If in block 503 a blank gap is identified having a gap length, or gap time, exceeding the predetermined gap length, or gap time, threshold, method 500 is pursued to block 504. Method 500 is directly iterated back to block 501 otherwise. In block 504, it is determined that servicing of the specific pen will take place during the blank gap at a determined level and timing of servicing in function of both of the received future specific pen firing data and of the collected historical specific pen firing data. In this example, the specific pen is a pretreatment pen, the printer being a latex ink printer comprising additional pens, the additional pens containing latex ink, the printer comprising a conveyor system for hot loading of printing media of different characteristics.

In the example methods described hereby, the collecting of historical specific pen firing data may be reset once the specific pen has been submitted to servicing. In some examples, historical specific pen firing data is collected during a period not exceeding 3 minutes of functioning of the printer beyond a present time. In some examples, historical specific pen firing data is collected during a period not exceeding 2 minutes of functioning of the printer beyond a present time. In some examples, historical specific pen firing data is collected during a period not exceeding 1 minute of functioning of the printer beyond a present time.

Figure 6:
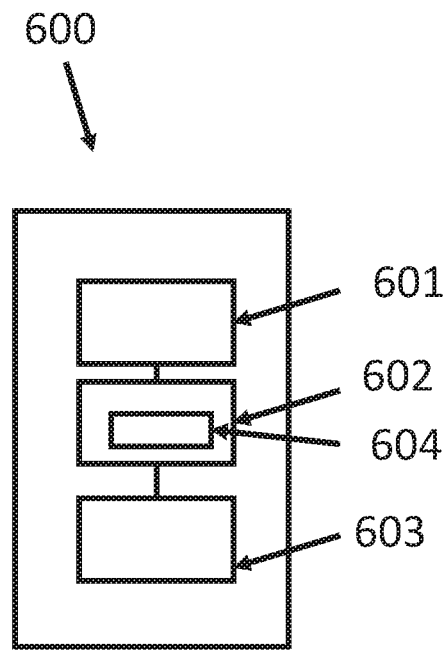
FIG. 6 illustrates an example printer controller.

Any of the example methods hereby described may be implemented for example on a printer controller 600 as illustrated on FIG. 6. Example printer controller 600 comprises a processor 601, a storage 602 coupled to the processor 601; a network interface 603 to receive print job data; and an instruction set 604 to cooperate with the processor 601 and the storage 602 to process data corresponding to a plurality of upcoming successive print jobs received at the network interface 603, store historical print job data in the storage 602 coupled to the processor 601, and determine a servicing routine of a specific pen in function of both of the processed data corresponding to a plurality of upcoming successive print jobs and of the stored historical print job data. Processor 601 may comprise electronic circuits for computation managed by an operating system.

FIG. 6 also illustrates a non-transitory machine-readable or computer readable storage medium, such as, for example, memory or storage unit 602, whereby the non-transitory machine-readable storage medium is encoded with instructions 604 executable by a processor such as processor 601, the machine-readable storage medium comprising instructions 604 to operate processor 601 to perform as per any of the example methods hereby described. In particular, non-transitory machine-readable storage medium 602 is encoded with instructions 604 executable by processor 601, the machine-readable storage medium 602 comprising:

instructions to receive future firing data of a specific pen for a plurality of upcoming successive print jobs;
instructions to store historical specific pen firing data; and
instructions to determine servicing of the specific pen in function of both of the received future specific pen firing data of the specific pen and of the stored historical specific pen firing data.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

What is claimed is:

1. A method for operating a printing device comprising a specific pen, the method comprising:
receiving future specific pen firing data related to a plurality of upcoming successive print jobs;
collecting historical specific pen firing data; and
determining a level and timing of servicing of the specific pen in function of both of the received future specific pen firing data and of the collected historical specific pen firing data.

2. The method according to claim 1, whereby each upcoming successive print job of the plurality is associated to a respective printing media, the printing device comprising a conveyor system for placing the respective printing media, the method comprising printing the successive upcoming print jobs on the respective printing media as the conveyor system places the respective media in a print zone of the printing device.

3. The method according to claim 2, whereby the conveyor system comprises a conveyor belt.

4. The method according to claim 2, whereby a specific printing media of the respective printing media is separated from a following printing media by a gap, the method comprising comparing the gap to a predetermined gap threshold.

5. The method according to claim 1, whereby the specific pen comprises a pretreatment fluid.

6. The method according to claim 5, whereby the pretreatment fluid comprises a crashing agent and a wetting agent.

7. The method according to claim 5, whereby the printing device comprises an additional pen, the additional pen comprising a printing fluid.

8. The method according to claim 7, whereby the method further comprising servicing the specific pen separately from a servicing of the additional pen.

9. The method according to claim 8, whereby the servicing of the specific pen separately from the servicing of the additional pen is separated in time.

10. The method according to claim 8, whereby the servicing of the specific pen separately from the servicing of the additional pen is separated in space.

11. The method according to claim 10, whereby the printing system comprises a plurality of web wipers, whereby the servicing of the specific pen comprises wiping the specific pen with a specific web wiper from the plurality of web wipers, the servicing of the additional pen comprising wiping the additional pen with a web wipers of the plurality of web wipers other than the specific web wiper.

12. The method according to claim 1, whereby the level of servicing of the specific pen comprises a lower level of servicing and a higher level of servicing.

13. The method according to claim 1, whereby the printing system comprises a spittoon, the servicing of the specific pen comprising the specific pen spitting in the spittoon.

14. A printer controller comprising:
a processor;
a storage coupled to the processor;
a network interface to receive print job data;
and an instruction set to cooperate with the processor and the storage to:
process data corresponding to a plurality of upcoming successive print jobs received at the network interface;
store historical print job data in the storage coupled to the processor; and
determine a servicing routine of a specific pen in function of both of the processed data corresponding to a plurality of upcoming successive print jobs and of the stored historical print job data.

15. A non-transitory machine-readable storage medium encoded with instructions executable by a processor, the machine-readable storage medium comprising:
  instructions to receive future firing data of a specific pen for a plurality of upcoming successive print jobs;
  instructions to store historical specific pen firing data; and
  instructions to determine servicing of the specific pen in function of both of the received future specific pen firing data of the specific pen and of the stored historical specific pen firing data.

* * * * *